US012754697B1

(12) United States Patent
Hack et al.

(10) Patent No.: US 12,754,697 B1
(45) Date of Patent: Oct. 6, 2026

(54) METHOD AND APPARATUS TO AUTOMATE COMMANDS SPANNING REGIONS WITH INCONSISTENT ATTRIBUTES

(71) Applicant: Sandisk Technologies, Inc., Milpitas, CA (US)

(72) Inventors: Stephen P Hack, Mountain View, CA (US); William Guthrie, Mountain View, CA (US); Dhanunjaya Rao Gorrle, Mountain View, CA (US); Vijay Motagi, Mountain View, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 19/222,035

(22) Filed: May 29, 2025

(51) Int. Cl.
*G06F 3/06* (2006.01)

(52) U.S. Cl.
CPC ............ *G06F 3/0659* (2013.01); *G06F 3/061* (2013.01); *G06F 3/0679* (2013.01)

(58) Field of Classification Search
CPC ....... G06F 3/0659; G06F 3/061; G06F 3/0679
USPC .................................................. 711/154, 100
See application file for complete search history.

(56) References Cited

U.S. PATENT DOCUMENTS

| | | | | |
|---|---|---|---|---|
| 7,930,439 B2 | 4/2011 | Furukawa | | |
| 10,282,132 B2 | 5/2019 | A | | |
| 2015/0058529 A1* | 2/2015 | Lin | G06F 3/0688 | 711/103 |
| 2016/0179402 A1* | 6/2016 | Iwashiro | G06F 3/0688 | 711/103 |
| 2016/0299690 A1* | 10/2016 | Jung | G06F 3/0688 | |

FOREIGN PATENT DOCUMENTS

| | | |
|---|---|---|
| CN | 110554833 A | 12/2019 |
| CN | 118377747 A | 7/2024 |

* cited by examiner

*Primary Examiner* — Hosain T Alam
*Assistant Examiner* — Zubair Ahmed
(74) *Attorney, Agent, or Firm* — Arlene P. Neal; NEAL BLIBO LLC

(57) ABSTRACT

A storage device meets demands for high throughput for host input/output (IO) commands. A hardware module receives the host IO command, determines that there is an exception condition in the host IO command, and forwards the host IO command to a controller. The controller splits the host IO command into sub-commands, changes length fields associated with the sub-commands to reflect a length of data in the region and turns off auto-complete signaling from the hardware module to a host completion queue. The controller submits a first sub-command to the hardware module for processing and receives an indication from the hardware module when processing is complete. The controller continues submission of the sub-commands up to a last sub-command. Prior to submitting the last sub-command, the controller resets the control register to turn on the auto-complete signaling and submit the last sub-command to the hardware module for processing.

20 Claims, 5 Drawing Sheets

METHOD AND APPARATUS TO AUTOMATE COMMANDS SPANNING REGIONS WITH INCONSISTENT ATTRIBUTES

BACKGROUND OF THE INVENTION

A storage device may be communicatively coupled to a host and to non-volatile memory including, for example, a NAND flash memory device on which the storage device may store data received from the host. The memory device may include multiple dies which may be divided into physical blocks and the storage device may store data in blocks on the memory device. The host may assign a logical block address (LBA) to a unit of data stored in the blocks on the memory device. The LBAs may be mapped one-to-one to physical addresses on the memory device and the mappings may be stored in a logical-to-physical (L2P) table. A controller on the storage device may manage the mappings in the L2P table so that when the host issues a command to access a unit of data, the controller may retrieve the data based on the mappings in the L2P table.

The storage device may communicate with the host via a Non-Volatile Memory Express (NVMe) protocol. When the storage device uses the NVMe protocol, the storage device may automate one or more hardware modules to meet demands for high throughput for input/output (IO) read and write commands. The automated hardware module(s) may exist as digital circuits that may work in tandem with general-purpose processors. The automated hardware module(s) may, for example, automatically fetch a host IO command request from a host submission queue, parse the command, and access attributes for storage ranges to determine which attributes apply to a received command. For example, the automated hardware module(s) may access a security key table to determine which key is required for a storage range in a received command. The automated hardware module(s) may also automatically transfer host data associated with a received command. After receiving a write command, the automated hardware module(s) may automatically transfer data in the write command after parsing the command request. After receiving a read command, the automated hardware module(s) may automatically transfer data associated with the command after extracting the host data from the memory device, placing host data into internal memory buffers, and submitting descriptors describing the transfer of each internal buffer to a transfer engine.

When the automated hardware module(s) successfully processes a host read/write command, the automated hardware module(s) may automatically send a completion states to a host completion queue. The automated hardware module(s) may understand Physical Region Page (PRP) lists (i.e., a mechanism to specify the location of data in host memory for a controller on the storage device to transfer data for read/write operations) or Scatter Gather Lists (SGL) (i.e., a technique to transfer data between the memory and peripherals that are not necessarily contiguous, allowing for more efficient data handling by breaking down data into smaller, manageable chunks). In understanding the PRP lists and SGL, the automated hardware module(s) may automatically retrieve the host memory addresses for host data transfer.

In some cases, when the automated hardware module(s) is processing a command, it may detect exception conditions in the command parameters. For example, with the NVMe protocol, the memory device may be divided into namespaces and when a storage device includes multiple namespaces, there may be discontinuity in the L2P mapping and the automated hardware module(s) may not process commands when the mapping table used for L2P lookup is not stored contiguously. The automated hardware module(s) may also be unable to process commands with different attributes, including, for example, different security keys across more than one security region. When automated hardware module(s) detect an exception condition and is unable to process a host IO request, the hardware module(s) may transfer the exception case to the controller or to an application-specific integrated circuit (ASIC) for the controller or ASIC to process the exception case.

Configuring the controller to handle exception cases may be more costly than processing the command in an automated hardware module. For example, configuring software (for example, the controller) to handle exception cases may result in duplicating the functions of the hardware module(s) in the software and duplicating the number of paths that may need to be tested. The software may also process the exception cases slower than an automated hardware module.

SUMMARY OF THE INVENTION

In some implementations, a storage device may meet demands for high throughput for host input/output (IO) commands. The storage device includes a hardware module to receive the host IO command, process the host IO command, determine that there is an exception condition in the host IO command that is not supported by an automation configuration in the hardware module, and forward the host IO command to a message queue. The storage device also includes a controller to retrieve the host IO command from the message queue and split the host IO command into sub-commands, wherein a sub-command is associated with a region. The controller may change length fields associated with the sub-commands to reflect a length of data in the region. The controller may also submit the sub-commands to the hardware module in sequence for an automation data path in the hardware module to process data transfer for a sub-command. The controller may receive an indication when the hardware module processes the sub-command.

In some implementations, a method is provided on the storage device for meeting demands for high throughput for host input/output (IO) commands. The method includes receiving, by the hardware module, the host IO command, processing the host IO command, determining that there is an exception condition in the host IO command that is not supported by an automation configuration in the hardware module, and forwarding the host IO command to a message queue. The method also includes retrieving, by a controller, the host IO command from the message queue, splitting the host IO command into sub-commands, wherein a sub-command is associated with a region, and changing length fields associated with the sub-commands to reflect a length of data in the region. The method further includes submitting, by the controller, the sub-commands to the hardware module in sequence for an automation data path in the hardware module to process data transfer for a sub-command, and receiving an indication when the hardware module processes the sub-command.

In some implementations, a storage device may meet demands for high throughput for host input/output (IO) commands. The storage device includes a hardware module to receive the host IO command, process the host IO command, determine that there is an exception condition in the host IO command that is not supported by an automation configuration in the hardware module, and forward the host IO command to a message queue. The storage device also includes a controller to retrieve the host IO command from the message queue and split the host IO command into sub-commands, wherein a sub-command is associated with a region. The controller may change length fields associated with the sub-commands to reflect a length of data in the region and set a control register to turn off auto-complete signaling from the hardware module to a host completion queue when the hardware module completes processing the sub-command associated with one region. The controller may submit a first sub-command to the hardware module for an automation data path in the hardware module to process data transfer for the first sub-command and receive an indication from the hardware module when the hardware module completes processing the first sub-command. The controller may start a command-transfer process to continue submission of the sub-commands up to a last sub-command, wherein during the command-transfer process the controller updates address fields and an offset for a Physical Region Page list for a memory address fetch hardware to interpret the Physical Region Page list as established by a host, Prior to submitting the last sub-command, the controller may reset the control register to turn on the auto-complete signaling from the hardware module to the host completion queue and submit the last sub-command to the hardware module for processing.

Figure 1:
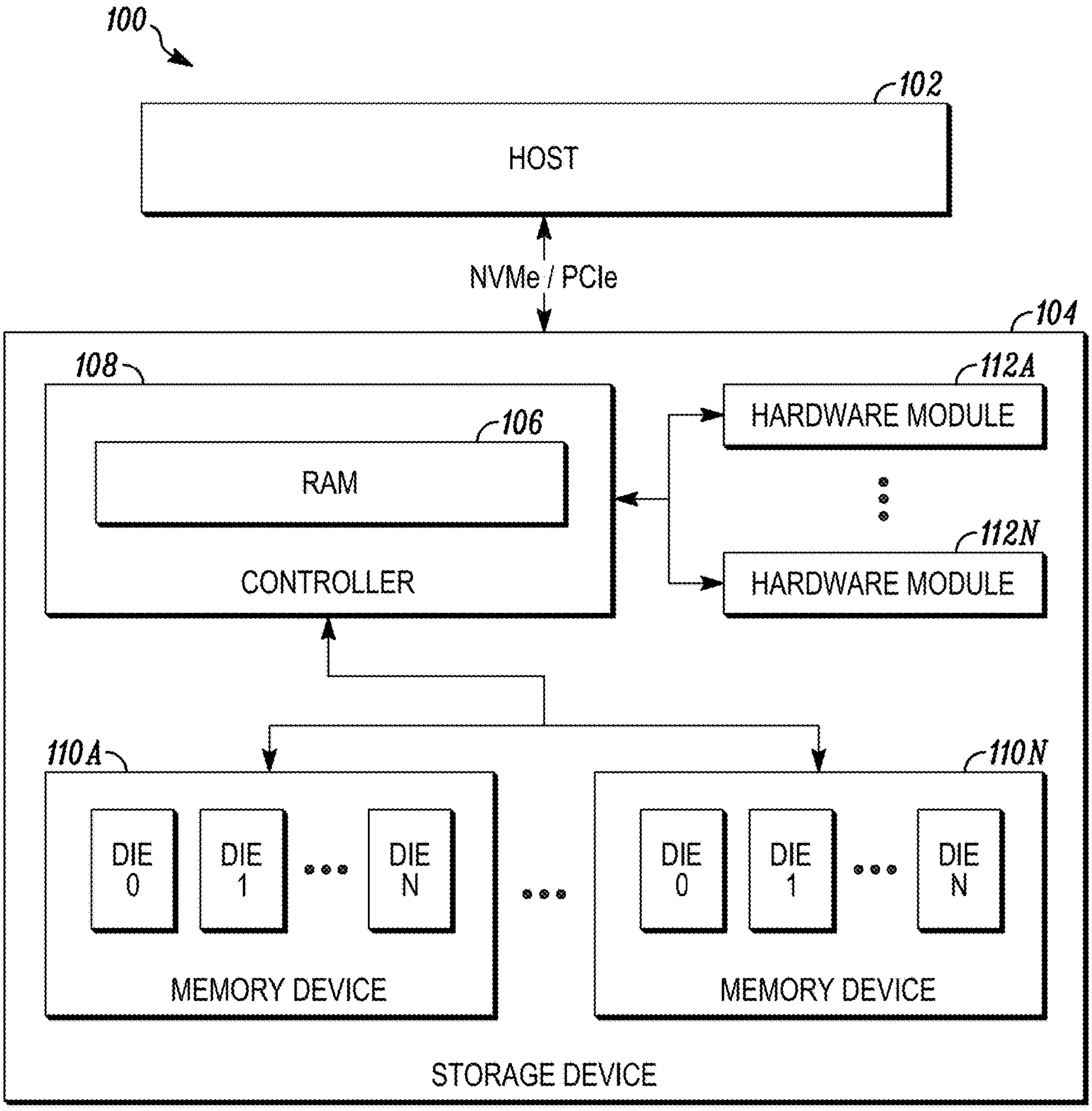
FIG. 1 is a schematic block diagram of an example system in accordance with some implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present disclosure.

The apparatus and method components have been represented where appropriate by conventional symbols in the drawings, showing those specific details that are pertinent to understanding the implementations of the present disclosure so as not to obscure the disclosure with details that will be readily apparent to those of ordinary skill in the art.

DETAILED DESCRIPTION OF THE INVENTION

The following detailed description of example implementations refers to the accompanying drawings. The same reference numbers in different drawings may identify the same or similar elements.

FIG. 1 is a schematic block diagram of an example system in accordance with some implementations. System 100 may include a host 102 and a storage device 104 that may be in the same physical location as components on a single computing device or on different computing devices that are communicatively coupled. Storage device 104 may communicate with host 102 via a Non-Volatile Memory Express (NVMe) protocol over a peripheral component interconnect express (PCIe) bus, and the like. Host 102 may include additional components (not shown in this figure for the sake of simplicity).

Storage device 104 may be, for example, a solid-state drive (SSD) that may include a random-access memory (RAM) 106, a controller 108, one or more storage components such as non-volatile memory devices 110*a*-110*n* (referred to herein as memory device(s) 110), and one or more automated hardware modules 112*a*-112*n* (referred to herein as hardware module(s) 112 or automated as hardware module(s) 112). RAM 106 may be, for example, static RAM (SRAM) or dynamic RAM (DRAM) that be used to temporarily store data on storage device 104. For example, RAM 106 may store portions of a logical-to-physical (L2P) table that may be used to map a logical block address (LBA) in a host command to a physical address on memory device 110.

Controllers 108 may interface with host 102 and process foreground operations including instructions transmitted from host 102. For example, controllers 108 may read data from and/or write to memory devices 110 based on instructions received from host 102. Controllers 108 may also execute background operations to manage resources on memory device 110. For example, controllers 108 may monitor memory devices 110 and may execute garbage collection and other relocation functions per internal relocation algorithms to refresh, recycle, and/or relocate the data on memory devices 110.

Memory devices 110 may be flash based. For example, memory devices 110 may be a NAND or NOR flash memory that may be used for storing host and control data over the operational life of memory devices 110. Memory devices 110 may include one or more dies (i.e., DIE 1-DIE N) connected to a memory bus including data lines and chip enable lines. Memory devices 110 may save data in blocks in various formats, with the formats being defined by the number of bits that may be stored per memory cell. Memory device 110 may be included in storage device 104 or may be otherwise communicatively coupled to storage device 104.

Hardware modules 112 may be automated to meet the demands for high throughput for host I/O write and read commands and may exist as digital circuits that work in tandem with processors such as controller 108. Hardware modules 112 may process the host I/O commands faster than software being executed on controller 108. As such, to achieve high IO processing per second (IOPS), an implementation may configure the hardware modules 112 to handle exception cases. When a hardware module 112 receives a host I/O command, hardware module 112 may determine if the command includes an exception condition (for example, a new and/or unexpected requirement) such that the command cannot be processed by hardware module 112. When hardware module 112 determines that an incoming host command includes an exception that is not supported by the automation configuration in hardware module 112, hardware module 112 may forward the command to controller 108 for processing.

An example of a command that includes an exception condition may be one for which there are different attributes or characteristics in two or more sub-ranges of the logical address space in the command. The different attributes may be, for example, a command requiring one security key for a first part of a logical address range in the command and a second security key for a second part of a logical address range in the command. In another example, the different attributes may be in a system where the mapping from the host logical address space to the physical address in memory device 110 involves an intermediate logical space used by a flash translation layer (FTL) to track physical addresses such that there may be a discontinuity in the host logical space to the internal logical space mapping that would prevent automated handling.

In an implementation, hardware module 112 may include an exception parser that may direct host IO command spanning multiple regions with inconsistent attributes to a message queue for processing by controller 108. For example, when hardware module 112 receives a host IO command with an exception condition in the command parameters or the logical storage address associated with the host IO command, hardware module 112 may send an interrupt alerts to controller 108 for controller 108 to examine the host IO command in the message queue. Controller 108 may retrieve the host IO command from the message queue and split the host IO command into sub-commands.

In an implementation, controller 108 may determine the length of the host IO command up to the end of a first region and modify a command length field to include the length of the host IO command up to the end of the first region. Controller 108 may update any other derived fields in the command data structures and may place (or leave) the original command length in a first control register/location in derived data that may control a buffer address fetch hardware. The interpretation of links in a PRP buffer list depends on the command transfer length. As such, placing the original command length in the first control register will ensure that the buffer address fetch hardware will interpret the address list as configured by host 102.

Controller 108 may set at least one other control register to suppress the automatic posting of a command status from hardware module 112 to a host completion queue. Controller 108 may write the command index, for example, for a first sub-command that may include the contents of the sub-command up to the end of the first region, to a control register to suppress the automatic posting of a completion status from hardware module 112 to the host completion queue when hardware module 112 handles/processes the first sub-command. When hardware module 112 transfers host data representing the first region of the command, the full host data will not have been transferred and, as such, suppressing the automatic posting of the command status for the first sub-command to a host completion queue will ensure that hardware module 112 does not post a completion status prior to processing the full command.

Controller 108 may also set at least one control register to configure hardware module 112 to send an indication to controller 108 when the last data transfer for the first region is complete. An index for the handled/processed (for example, first) command may be written so that hardware module 112 may provide a signal for a completed data transfer for only the handled command. Controller 108 may submit the first command to hardware module 112 and wait for the standard automation data path in hardware module 112 to process the data transfer. When hardware module 112 transfers the data associated with the first command, hardware module 112 may send an indication to controller 108.

Hardware module 112 may send signals to controller 108 through interrupt signals and/or information in message queues when host bus transfers are complete. When the last data packet (transfer requested through descriptors) for a set of commands is complete, hardware module 112 may also send signals to controller 108. Hardware module 112 may also send signals to controller 108 when processing of the last data packet, for a specified set of commands, is complete. Hardware module 112 may also send signals to controller 108 when the transfer of the data for every descriptor is complete, for a specified set of commands. The hardware configuration may provide a way to select the commands that are affected.

After receiving the indication that the data transfer associated with a command is complete, controller 108 may start a command-transfer process that begins with determining the host LBA that corresponds to the start of the second/upcoming region, determining the length of the second/upcoming region, and updating the start LBA and end LBA command fields.

Controller 108 may determine in which buffer the host data will start for the second/upcoming region. That buffer address may be read from host memory at the determined offset into a PRP list. Controller 108 may use the buffer address to update a first address field (for example, a PRP1 address field) in the command data structure. Controller 108 may also update the offset in an entry (for example, a PRP2 entry) to use a later memory address (i.e., the memory address associated with the start of the second/upcoming region) for the start of the rest of the PRP memory address list. The ability to provide a transfer length to be used to interpret a PRP list that is not the length of data for the immediate transfer may modify how link entries can be interpreted when extracting the addresses of host memory buffers. Controller 108 may subtract the length of the first region from the command length and update the first register. This may enable the memory address fetch hardware to continue PRP interpretation as established by host 102. Controller 108 may resubmit the modified command to hardware module 112 for processing as if the modified command had come from a host submission queue. If there are more than two regions, then controller 108 may repeat the command-transfer process until it reaches the last region in the command.

In processing the last region in the host IO command, controller 108 may undo/reset the configurations of the hardware control register(s) that were set to suppress the automatic transfer of a command status entry from hardware module 112 to the host completion queue and to signal controller 108 when the last data for a region is complete. This may enable hardware module 112 to transfer a status entry to the host completion queue after the last region is processed since the controller 108 does not need to be alerted to process more regions. Controller 108 may submit the last sub-command (i.e., the portion of the command for the last region) to hardware module 112 for processing.

Implementations thus provide for the use of optional controls to breakup command execution into two or more sub-commands, each of which can be submitted to an automated hardware module 112. Using hardware module 112 to execute sub-commands, rather than providing a command with an exception to controller 108 for processing may allow for faster command completion, higher throughput with less processor overhead, and less code memory use.

Storage device 104 may perform these processes based on one or more processors, for example, controller 108 (and the components thereon) executing software instructions stored by a non-transitory computer-readable medium, such as a storage component that may be, for example, memory device 110. As used herein, the term "computer-readable medium" refers to a non-transitory memory device. Software instructions may be read into the storage component from another computer-readable medium or from another device. When executed, software instructions stored in the storage component may cause one or more processors, for example, controller 108 (and the components on controller 108) to perform one or more processes described herein. Additionally, or alternatively, hardware circuitry including, for example, automated hardware module 112, may be used in place of or in combination with software instructions to perform one or more processes described herein. Thus, implementations described herein are not limited to any specific combination of hardware circuitry and software. System 100 may include additional components (not shown in this figure for the sake of simplicity). FIG. 1 is provided as an example. Other examples may differ from what is described in FIG. 1.

Figure 2:
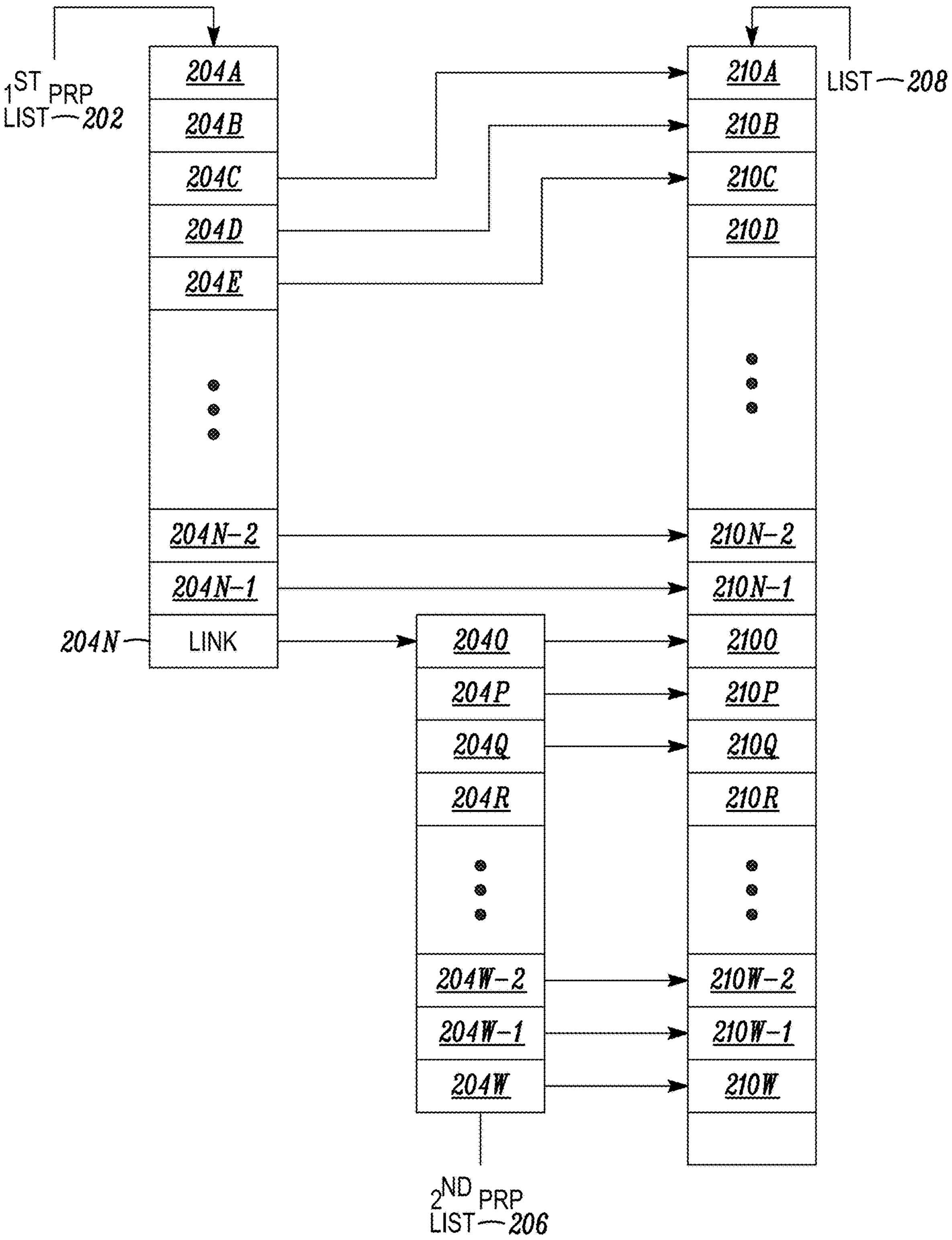
FIG. 2 is a block diagram of an example Physical Region Page (PRP) list that may be processed in accordance with some implementations.

FIG. 2 is a block diagram of an example Physical Region Page (PRP) list that may be processed in accordance with some implementations. Host 102 may prepare a first PRP buffer list 202 that may include entries 204*a*-204*n*. Host 102 may start the addresses in PRP buffer list 202 at entry/block 204*c*. PRP buffer list 202 may also include a link to a second buffer list 206 that may include entries 204O-204W, wherein the link connecting first PRP buffer list 202 and second buffer list 206 may be in entry 204*n*. List 210 shows a linear representation of the host transfer buffer.

A complication may occur when a transition between ranges occurs between logical blocks stored in a block addressed at the start of a new list, (i.e., at 2100 in list 210). Given an original command length and the NVMe rules for PRP construction, the address for the block 204O is stored at the head of the second PRP list 206. However, the length of a first modified command would imply that the address is at the end of the first PRP list 202, i.e., at 204N which is where the link address is stored. In many systems, storage device 104 may not be allowed to write into the host memory that stores the buffer addresses, and as such, storage device 104 may not change the link address to be the value stored in 204O. That is why it may be important to be able to give the hardware accelerators a command length for PRP retrieval that may be more than the transfer length. FIG. 2 is provided as an example. Other examples may differ from what is described in FIG. 2.

Figure 3:
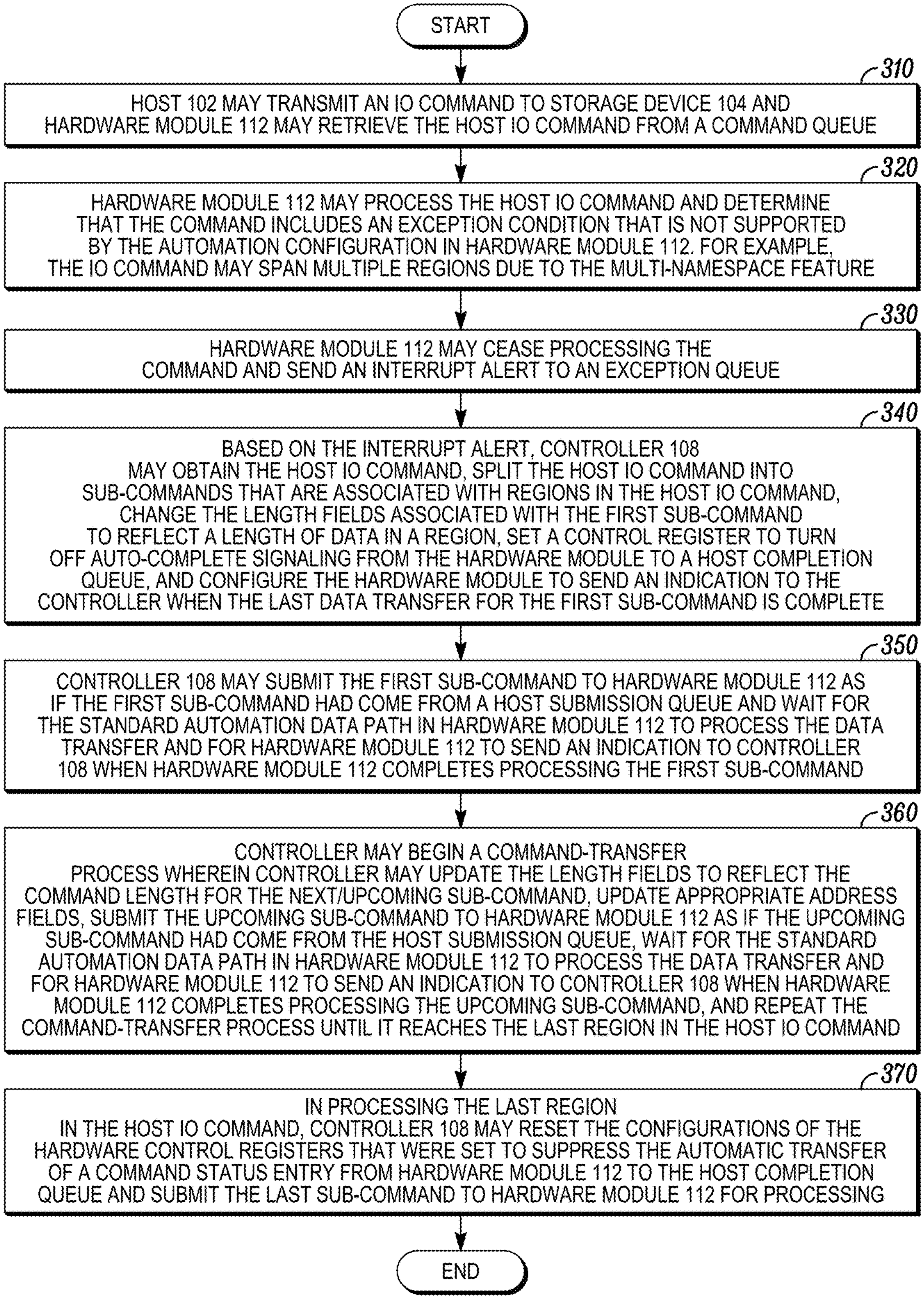
FIG. 3 is an example flow diagram for processing a host IO command with an exception condition in a hardware module in accordance with some implementations.

FIG. 3 is an example flow diagram for processing a host IO command with an exception condition in a hardware module in accordance with some implementations. At 310, host 102 may transmit an IO command to storage device 104 and hardware module 112 may retrieve the host IO command from a command queue. At 320, hardware module 112 may process the host IO command and determine that the command includes an exception condition that is not supported by the automation configuration in hardware module 112. For example, the IO command may span multiple regions due to the multi-namespace feature. At 330, hardware module 112 may cease processing the command and send an interrupt alert to an exception queue.

At 340, based on the interrupt alert, controller 108 may obtain the host IO command, split the host IO command into sub-commands that are associated with regions in the host IO command, change the length fields associated with the first sub-commands to reflect a length of data in a region, set a control register to turn off auto-complete signaling from the hardware module to a host completion queue, and configure the hardware module to send an indication to the controller when the last data transfer for the first sub-command is complete. At 350, controller 108 may submit the first sub-command to hardware module 112 as if the first sub-command had come from a host submission queue and wait for the standard automation data path in hardware module 112 to process the data transfer and for hardware module 112 to send an indication to controller 108 when hardware module 112 completes processing the first sub-command. At 360, controller may begin a command-transfer process wherein controller may update the length fields to reflect the command length for the next/upcoming sub-command, update appropriate address fields, submit the upcoming sub-command to hardware module 112 as if the upcoming sub-command had come from the host submission queue, wait for the standard automation data path in hardware module 112 to process the data transfer and for hardware module 112 to send an indication to controller 108 when hardware module 112 completes processing the upcoming sub-command, and repeat the command-transfer process until it reaches the last region in the host IO command. At 370, in processing the last region in the host IO command, controller 108 may undo/reset the configurations of the hardware control registers that were set to suppress the automatic transfer of a command status entry from hardware module 112 to the host completion queue and submit the last sub-command (i.e., the portion of the host IO command for the last region) to hardware module 112 for processing. FIG. 3 is provided as an example. Other examples may differ from what is described in FIG. 3.

Figure 4:
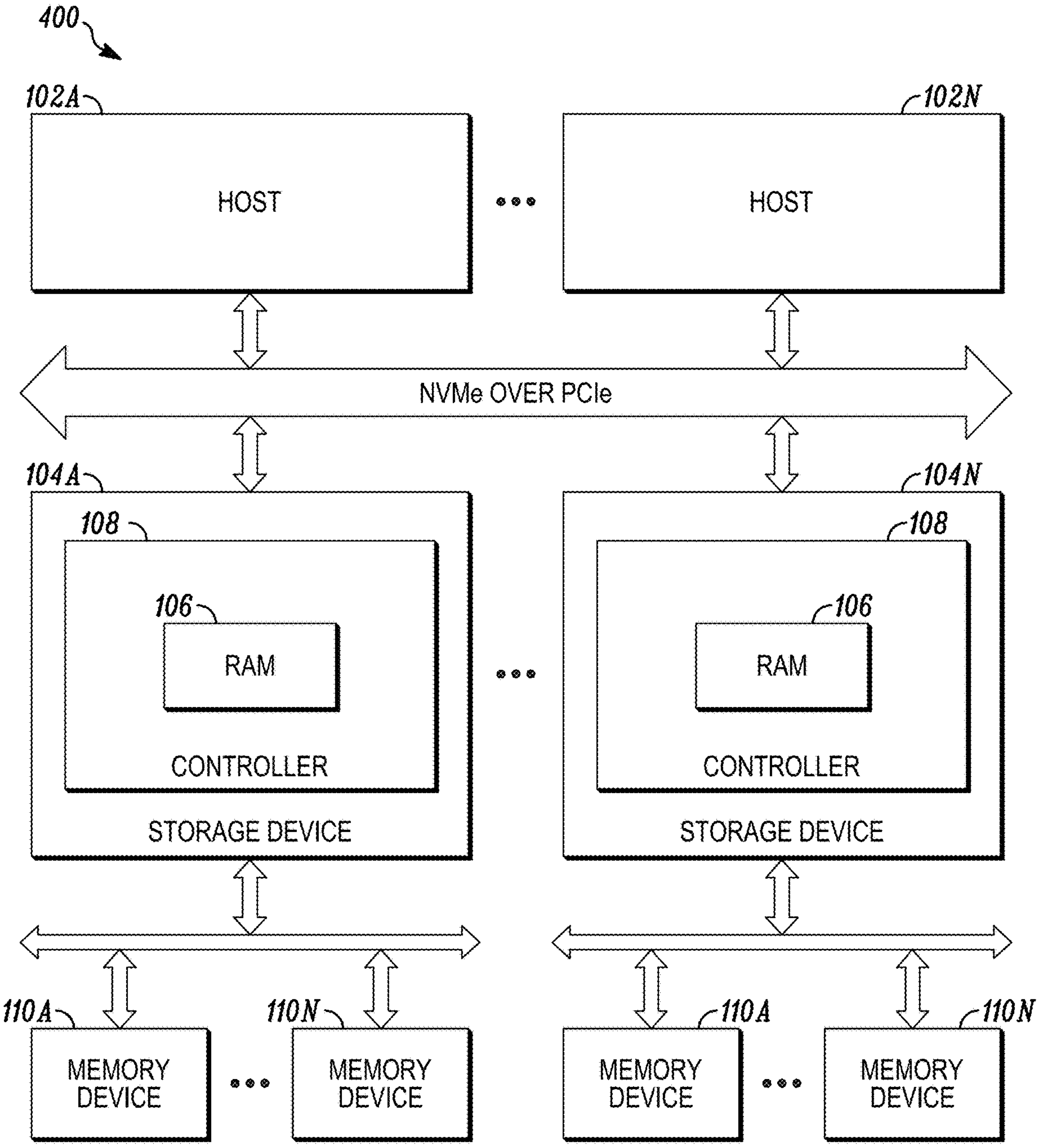
FIG. 4 is a diagram of an example environment in which systems and/or methods described herein are implemented.

FIG. 4 is a diagram of an example environment in which systems and/or methods described herein are implemented. As shown in FIG. 4, Environment 400 may include hosts 102-102*n* (referred to herein as host(s) 102), and one or more storage devices 104*a*-104*n* (referred to herein as storage device(s) 104). Controller 108 may enable hardware module 112 to process a host IO command with an exception condition. Hosts 102 and storage devices 104 may communicate via Non-Volatile Memory Express (NVMe) over peripheral component interconnect express (PCI Express or PCIe), SD, or the like.

Devices of Environment 400 may interconnect via wired connections, wireless connections, or a combination of wired and wireless connections. For example, the network in FIG. 4 may include NVMe over Fabric (NVMe-oF), Internet Small Computer Systems Interface (iSCSI), Fibre Channel (FC), Fibre Channel Over Ethernet (FCOE) connectivity and any another type of next-generation network and storage protocols, a local area network (LAN), a wide area network (WAN), a metropolitan area network (MAN), a private network, an ad hoc network, an intranet, the Internet, a fiber optic-based network, a cloud computing network, or the like, and/or a combination of these or other types of networks.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of Environment 400 may perform one or more functions described as being performed by another set of devices of Environment 400.

Figure 5:
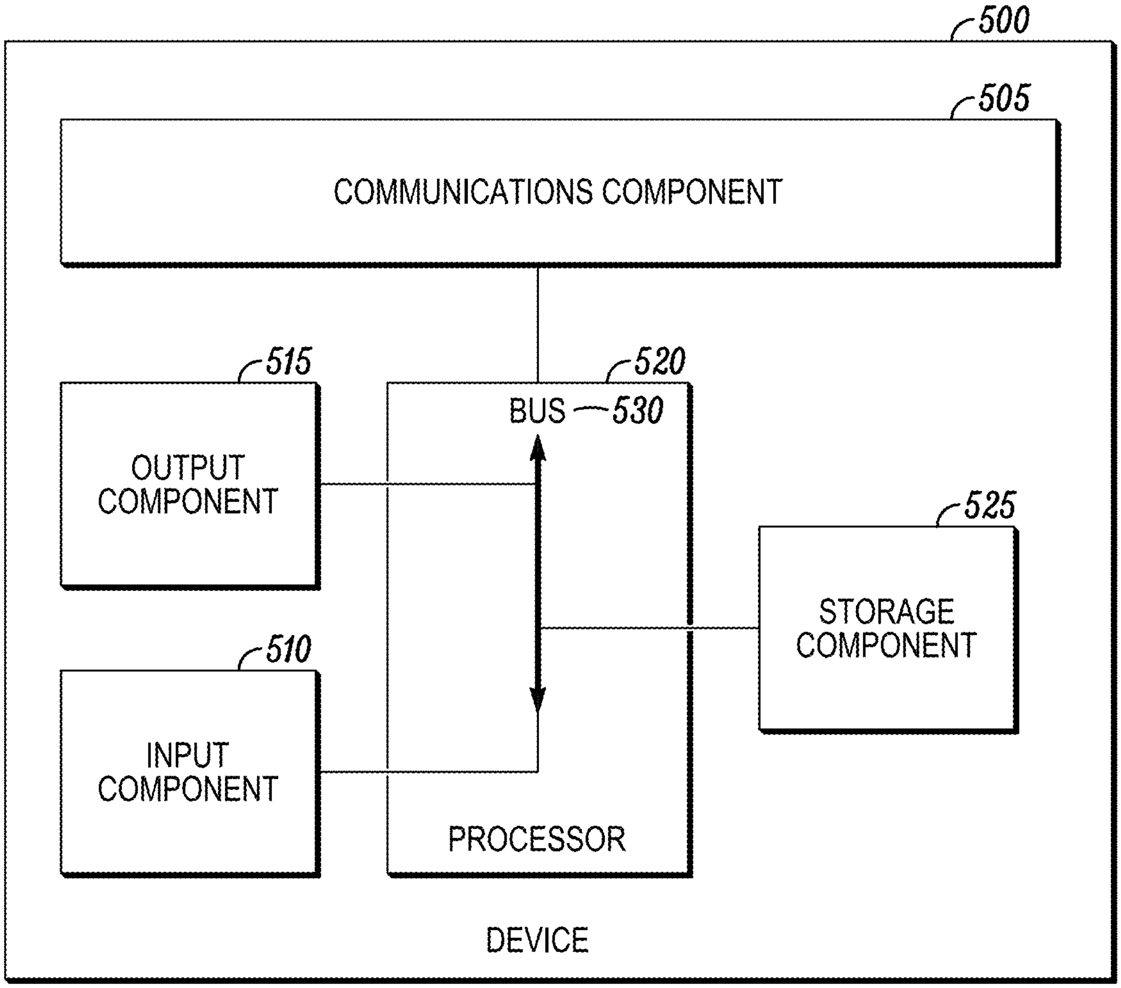
FIG. 5 is a diagram of example components of one or more devices of FIG. 1.

FIG. 5 is a diagram of example components of one or more devices of FIG. 1. In some implementations, host 102 may include one or more devices 500 and/or one or more components of device 500. Device 500 may include, for example, a communications component 505, an input component 510, an output component 515, a processor 520, a storage component 525, and a bus 530. Bus 530 may include components that enable communication among multiple components of device 500, wherein components of device 500 may be coupled to be in communication with other components of device 500 via bus 530.

Input component 510 may include components that permit device 500 to receive information via user input (e.g., keypad, a keyboard, a mouse, a pointing device, and a network/data connection port, or the like), and/or components that permit device 500 to determine the location or other sensor information (e.g., an accelerometer, a gyroscope, an actuator, another type of positional or environmental sensor). Output component 515 may include components that provide output information from device 500 (e.g., a speaker, display screen, and network/data connection port, or the like). Input component 510 and output component 515 may also be coupled to be in communication with processor 520.

Processor 520 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 may include one or more processors capable of being programmed to perform a function. Processor 520 may be implemented in hardware, firmware, and/or a combination of hardware and software.

Storage component 525 may include one or more memory devices, such as random-access memory, read-only memory (ROM), and/or another type of dynamic or static storage device (e.g., a flash memory, a magnetic memory, and/or optical memory) that stores information and/or instructions for use by processor 520. A memory device may include memory space within a single physical storage device or memory space spread across multiple physical storage devices. Storage component 525 may also store information and/or software related to the operation and use of device 500. For example, storage component 525 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, CXL device and/or another type of non-transitory computer-readable medium, along with a corresponding drive.

Communications component 505 may include a transceiver-like component that enables device 500 to communicate with other devices, such as via a wired connection, a wireless connection, or a combination of wired and wireless connections. The communications component 505 may permit device 500 to receive information from another device and/or provide information to another device. For example, communications component 505 may include an Ethernet interface, an optical interface, a coaxial interface, an infrared interface, a radio frequency (RF) interface, a universal serial bus (USB) interface, a Wi-Fi interface, and/or a cellular network interface that may be configurable to communicate with network components, and other user equipment within its communication range. Communications component 505 may also include one or more broadband and/or narrowband transceivers and/or other similar types of wireless transceiver configurable to communicate via a wireless network for infrastructure communications. Communications component 505 may also include one or more local area network or personal area network transceivers, such as a Wi-Fi transceiver or a Bluetooth transceiver.

Device 500 may perform one or more processes described herein. For example, device 500 may perform these processes based on processor 520 executing software instructions stored by a non-transitory computer-readable medium, such as storage component 525. As used herein, the term "computer-readable medium" refers to a non-transitory memory device. Software instructions may be read into storage component 525 from another computer-readable medium or from another device via communications component 505. When executed, software instructions stored in storage component 525 may cause processor 520 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

The foregoing disclosure provides illustrative and descriptive implementations but is not intended to be exhaustive or to limit the implementations to the precise form disclosed herein. One of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of present teachings.

As used herein, the term "component" is intended to be broadly construed as hardware, firmware, and/or a combination of hardware and software. It will be apparent that systems and/or methods described herein may be implemented in different forms of hardware, firmware, and/or a combination of hardware and software.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related items, unrelated items, and/or the like), and may be used interchangeably with "one or more." The term "only one" or similar language is used where only one item is intended. Further, the phrase "based on" is intended to mean "based, at least in part, on" unless explicitly stated otherwise.

Moreover, in this document, relational terms such as first and second, top and bottom, and the like, may be used solely to distinguish one entity or action from another entity or action without necessarily requiring or implying any actual such relationship or order between such entities or actions. The terms "comprises," "comprising," "has", "having,"

"includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", or "contains . . . a" does not, without more constraints, preclude the existence of additional identical elements in the process, method, article, or apparatus that comprises, has, includes, contains the element. The terms "substantially", "essentially", "approximately", "about" or any other version thereof, are defined as being close to as understood by one of ordinary skill in the art, and in one non-limiting implementation, the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way but may also be configured in ways that are not listed.

We claim:

1. A storage device to meet demands for high throughput for host input/output (IO) commands, the storage device comprises:

a hardware module to receive the host IO command, process the host IO command, determine that there is an exception condition in the host IO command that is not supported by an automation configuration in the hardware module, and forward the host IO command to a message queue; and a controller to retrieve the host IO command from the message queue, i) split the host IO command into sub-commands, wherein a sub-command is associated with a region, and ii) change length fields associated with the sub-commands to reflect a length of data in the region, submit the sub-commands to the hardware module in sequence for an automation data path in the hardware module to process data transfer for a sub-command, receive an indication when the hardware module processes the sub-command and provide a completion status to a host completion queue when the hardware module processes the sub-commands in the host IO command.

2. The storage device of claim 1, wherein the controller modifies a command length field to include a length of the host IO command in a first region.

3. The storage device of claim 1, wherein the controller places an original command length in a first control register, wherein the original command length is used to control a buffer address fetch hardware to interpret an address list as provided by a host.

4. The storage device of claim 1, wherein the controller sets a control register to turn off auto-complete signaling from the hardware module to the host completion queue when the hardware module completes processing the sub-command associated with one region, submits a first sub-command to the hardware module for the automation data path in the hardware module to process the data transfer for the first sub-command, receives an indication from the hardware module when the hardware module completes processing the first sub-command, and continue submission of the sub-commands up to a last sub-command, prior to submitting the last sub-command, resets the control register to turn on the auto-complete signaling from the hardware module to the host completion queue; and submits the last sub-command to the hardware module for processing.

5. The storage device of claim 4, wherein the controller writes a command index for the first sub-command to the control register to suppress the hardware module from automatically posting a command status to the host completion queue when the hardware module processes the first sub-command.

6. The storage device of claim 4, wherein the controller sets at least one other control register to configure the hardware module to send an indication to the controller when the last data transfer for the sub-command associated with one region is complete.

7. The storage device of claim 1, wherein the controller executes a command transfer process after submitting a first sub-command to the hardware module, wherein in the command transfer process the controller determines a host logical block address that corresponds with a start of an upcoming region, determines a length of the upcoming region, updates logical block address fields, and provides information for a memory address fetch hardware to interpret a Physical Region Page list as established by a host.

8. The storage device of claim 1, wherein the controller and writes an index for the sub-command associated with the region so that the hardware module provides a signal for data transfer for only a processed sub-command and the hardware module transfers a status entry to the controller after processing each sub-command other than a last sub-command and transfers the status entry to the a host completion queue after processing the last sub-command.

9. The storage device of claim 1, wherein the exception condition the host IO command spanning multiple regions with inconsistent attributes.

10. A storage device to meet demands for high throughput for host input/output (IO) commands, the storage device comprises:

a hardware module to receive the host IO command, process the host IO command, determine that there is an exception condition in the host IO command that is not supported by an automation configuration in the hardware module, and forward the host IO command to a message queue; and a controller to retrieve the host IO command from the message queue, i) split the host IO command into sub-commands, wherein a sub-command is associated with a region, and ii) change length fields associated with the sub-commands to reflect a length of data in the region, set a control register to turn off auto-complete signaling from the hardware module to a host completion queue when the hardware module completes processing the sub-command associated with one region, submit a first sub-command to the hardware module for an automation data path in the hardware module to process data transfer for the first sub-command, receive an indication from the hardware module when the hardware module completes processing the first sub-command, start a command-transfer process to continue submission of the sub-commands up to a last sub-command, wherein during the command-transfer process the controller updates address fields and an offset for a Physical Region Page list for a memory address fetch hardware to interpret the Physical Region Page list as established by a host, prior to submitting the last sub-command, reset the control register to turn on the auto-complete signaling from the hardware module to the host completion queue; and submit the last sub-command to the hardware module for processing.

11. The storage device of claim 10, wherein the hardware module transfers a status entry to the controller after processing each sub-command other than the last sub-command and transfers the status entry to the host completion queue after processing the last sub-command.

12. A method in a storage device for meeting demands for high throughput for host input/output (IO) commands, the storage device comprises a hardware module and a controller to execute the method comprising:

receiving, by the hardware module, the host IO command, processing the host IO command, determining that there is an exception condition in the host IO command that is not supported by an automation configuration in the hardware module, and forwarding the host IO command to a message queue;

retrieving, by a controller, the host IO command from the message queue, splitting the host IO command into sub-commands, wherein a sub-command is associated with a region, and changing length fields associated with the sub-commands to reflect a length of data in the region;

submitting, by the controller, the sub-commands to the hardware module in sequence for an automation data path in the hardware module to process data transfer for a sub-command, and receiving an indication when the hardware module processes the sub-command; and providing a completion status to a host completion queue when the hardware module processes the sub-commands in the host IO command.

13. The method of claim 12, further comprising setting, by the controller, a control register to turn off auto-complete signaling from the hardware module to a host completion queue when the hardware module completes processing the sub-command associated with one region;

submitting, by the controller, a first sub-command to the hardware module for the automation data path in the hardware module to process data transfer for the first sub-command, receiving an indication from the hardware module when the hardware module completes processing the first sub-command, and continuing submission of the sub-commands up to a last sub-command; and prior to submitting the last sub-command, resetting, by the controller, the control register to turn on the auto-complete signaling from the hardware module to the host completion queue and submit the last sub-command to the hardware module for processing.

14. The method of claim 13, wherein setting the control register comprises i) placing an original command length in a first control register, wherein the original command length in is used to control a buffer address fetch hardware to interpret an address list as provided by a host and ii) writing a command index for the first sub-command to the control register to suppress the hardware module from automatically posting a command status to the host completion queue when the hardware module processes the first sub-command.

15. The method of claim 13, wherein setting the control register comprises writing an index for the sub-command associated with the region so that the hardware module provides a signal for data transfer for only a processed sub-command.

16. The method of claim 13, wherein setting the control register comprises setting at least one other control register to configure the hardware module to send an indication to the controller when the last data transfer for the sub-command associated with one region is complete.

17. The method of claim 12, wherein submission of the sub-commands up to a last sub-command comprises executing a command transfer process after submitting a first sub-command to the hardware module, wherein the command transfer process includes determining a host logical block address that corresponds with a start of an upcoming region, determining a length of the upcoming region, updating logical block address fields, and providing information for a memory address fetch hardware to interpret a Physical Region Page list as established by a host.

18. The method of claim 12, further comprising transferring, by the hardware module, a status entry to the controller after processing each sub-command other than a last sub-command and transferring the status entry to the host completion queue after processing the last sub-command.

19. The method of claim 12, further comprising directing, by the hardware module, the host IO command spanning multiple regions with inconsistent attributes to the message queue for processing by the controller.

20. The method of claim 12, further comprising sending, by the hardware module, an interrupt alert to the controller for the controller to examine the command in the message queue.

* * * * *